United States Patent
Belnap

(10) Patent No.: US 12,325,814 B2
(45) Date of Patent: Jun. 10, 2025

(54) LUMINESCENT DIAMOND

(71) Applicant: Schlumberger Technology Corporation, Sugar Land, TX (US)

(72) Inventor: J. Daniel Belnap, Provo, UT (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 627 days.

(21) Appl. No.: 17/421,403

(22) PCT Filed: Jan. 15, 2020

(86) PCT No.: PCT/US2020/013664
§ 371 (c)(1),
(2) Date: Jul. 8, 2021

(87) PCT Pub. No.: WO2020/150341
PCT Pub. Date: Jul. 23, 2020

(65) Prior Publication Data
US 2022/0056337 A1    Feb. 24, 2022

Related U.S. Application Data

(60) Provisional application No. 62/793,032, filed on Jan. 16, 2019.

(51) Int. Cl.
*C09K 11/65* (2006.01)
*C01B 32/28* (2017.01)

(52) U.S. Cl.
CPC .............. *C09K 11/65* (2013.01); *C01B 32/28* (2017.08); *C01P 2002/54* (2013.01);
(Continued)

(58) Field of Classification Search
CPC ..... C09K 11/65; C01B 32/28; C01P 2002/54; C01P 2002/60; C01P 2004/61; C01P 2004/62; C01P 2004/64
(Continued)

(56) References Cited

U.S. PATENT DOCUMENTS 8,168,413 B2   5/2012  Chang et al.
9,465,035 B2  10/2016  Shirakawa et al.
(Continued)

FOREIGN PATENT DOCUMENTS

CN   107651858 A   2/2018
CN   108918485 A  11/2018
(Continued)

OTHER PUBLICATIONS

Yushin et al., "Effect of sintering on structure of nanodiamond", Diamond & Related Materials 14 (2005) 1721-1729). (Year: 2005).*
(Continued)

*Primary Examiner* — Anita Nassiri-Motlagh
(74) *Attorney, Agent, or Firm* — Jeffrey D. Frantz

(57) ABSTRACT

Luminescent diamond is made by subjecting a volume of diamond grains to high-pressure/high-temperature conditions with or without a catalyst to cause the grains to undergo plastic deformation to produce nitrogen vacancy defects in the diamond grains, increasing the luminescent activity/intensity of the resulting diamond material. The consolidated diamond material may be further treated to further increase luminescent activity/intensity, which treatment may comprise reducing the consolidated diamond material to diamond particles, heat treatment in vacuum, and air heat treatment, which reducing process further increases luminescent activity/intensity. The resulting luminescent diamond particles display a level of luminescence intensity
(Continued)

greater than that of conventional luminescent nanodiamond, and may be functionalized for use in biological applications.

15 Claims, 6 Drawing Sheets

(52) U.S. Cl.
CPC ...... *C01P 2002/60* (2013.01); *C01P 2004/61* (2013.01); *C01P 2004/62* (2013.01); *C01P 2004/64* (2013.01)

(58) Field of Classification Search
USPC .................................................. 252/301.4 F
See application file for complete search history.

(56) References Cited

U.S. PATENT DOCUMENTS

| | | | |
|---|---|---|---|
| 10,105,824 | B2 | 10/2018 | Bao et al. |
| 2003/0044613 | A1 | 3/2003 | Cho et al. |
| 2005/0019114 | A1 | 1/2005 | Sung |
| 2009/0127506 | A1 | 5/2009 | Twitchen et al. |
| 2010/0126406 | A1 | 5/2010 | Yan |
| 2011/0241266 | A1 | 10/2011 | Wardoyo et al. |
| 2015/0033637 | A1 | 2/2015 | Naidoo |
| 2015/0183091 | A1 | 7/2015 | Bao et al. |

FOREIGN PATENT DOCUMENTS

| | | |
|---|---|---|
| JP | 2006172718 A | 6/2006 |
| WO | 9323204 A1 | 11/1993 |
| WO | 2019209702 A1 | 10/2019 |

OTHER PUBLICATIONS

Itoh et al., "Effects of starting carbon and solvent-catalyst on the reaction sintering of diamond", Journal of Material Science 23 (1988) 2877-2881. (Year: 1988).*

Boudou et al., "High yield fabrication of fluorescent nanodiamonds", Nanotechnology 20 (2009). (Year: 2009).*

Cook et al., "Trends and recent developments in the material manufacture and cutting tool application of polycrystalline diamond and polycrystalline cubic boron nitride", International Journal of Refractory Metals & Hard Materials 18 (2000) 147-152. (Year: 2000).*

International Search Report and Written Opinion issued in International Patent application PCT/US2020/013664 on May 12, 2020, 12 pages.

Kanda, H. et al., "Change of luminescence character of Ib diamonds with HPHT treatment", Diamond and related materials, 2001, vol. 10, pp. 1665-1669.

Ikeda, K. et al., "Optical properties of ultrapure nano-polycrystalline diamond", Japanese Journal of Applied Physics, 2016, vol. 55, Article No. 120306, pp. 120306-1-120306-4.

Davey et al., An investigation of plastic deformation in sintered diamond compacts using photoluminescence spectroscopy. Journal of Materials Science Letters vol. 3, pp. 1090-1092, Dec. 1984.

Extended Search Report in European Patent Application No. 20740949.1, dated Sep. 9, 2022, 10 pages.

First Chinese Office Action in Chinese Patent Application No. 2020800170928, dated Jun. 27, 2022, 13 pages.

First Office Action issued in Japan Patent Application No. 2021541278 dated Jan. 9, 2024, 7 pages.

Second Office Action issued in Japan Patent Application No. 2021541278 dated Jul. 1, 2024, 7 pages.

* cited by examiner

LUMINESCENT DIAMOND

CROSS-REFERENCE TO RELATED APPLICATIONS

The present application is a National Stage Entry of International Patent Application No. PCT/US2020/013664, filed Jan. 15, 2020, and claims priority to U.S. Provisional Application No. 62/793,032, filed Jan. 16, 2019, the entirety of which is incorporated herein by reference.

BACKGROUND

Laser-infused fluorescence is a known technique adopted for better understanding how biological systems function at a molecular level through the probing of biomolecules individually for observation. In an example, laser-infused fluorescence may be applied to image and track a single molecule or particle in a biological cell or the like, e.g., in-vivo biological sensors for internal organ mapping, cell imaging, and the like. One type of substance used for laser-infused fluorescence is luminescent nanodiamond, which is nano-sized diamond particles or grains that has been developed to emit light when excited by a light source within a desired wavelength as called for by the end-use application. While the existence of luminescent nanodiamond is known, the methods and techniques currently used to make such luminescent nanodiamond are expensive, energy and time intensive, adding to not only the cost of the substance but limiting the availability of the same for desired use.

SUMMARY

Luminescent diamond and methods of making the same are disclosed herein, and include subjecting a volume of precursor diamond grains to a high-pressure/high-temperature condition to cause the grains to undergo plastic deformation to produce nitrogen vacancy defects in the diamond grains, that increases the luminescent activity and intensity of the resulting diamond material as compared to that of the precursor diamond grains. In some embodiments, the consolidated diamond material may have a luminescence intensity that is at least about 2 orders of magnitude greater than a luminescence intensity of the precursor diamond powder. In some embodiments, a catalyst material may or may not be included with the volume of diamond grains, in which case the resulting consolidated diamond material may be a body of mechanically combined or semi-sintered diamond grains or may be a fully-sintered polycrystalline body. In some embodiments where a polycrystalline body is produced, the amount of catalyst material used may be less than an amount useful to produce a fully-sintered polycrystalline body. In some embodiments, the catalyst material may be a metal solvent catalyst or may be a carbonate catalyst, where use of a carbonate catalyst produces a carbonate PCD body having a differing level of luminescence intensity than the luminescence intensity of a cobalt PCD body. This difference may be manifest in the spectral location and/or the intensity of the resulting luminescence peaks.

The diamond material formed by the high-pressure/high-temperature process may be treated to further increase the level of luminescence intensity of the diamond material. In some embodiments, such treatment may be separate from and precede sizing the diamond material to diamond particles. The diamond material formed by the high-pressure/high-temperature process is subjected to a reduction or sizing process to form diamond particles having a desired particle size. In some embodiments, the diamond material may be sized to have nanometer sized diamond particles. During the sizing reduction, the diamond material increases the surface area that is exposed to the radiation source producing the luminescence thereby increasing the resulting intensity, and may also undergo further plastic deformation, potentially resulting in a further increase in luminescence intensity when compared to the consolidated diamond material. In some embodiments, the sized diamond particles have a luminescence intensity that is at least about 10 percent greater than that of the diamond material formed during the high-pressure/high-temperature process. In some embodiments, another method to increase the luminescence activity is to repeat the HPHT process on diamond material previously HPHT treated, such as heat treatment in an air or inert atmosphere, heat treatment in an oxygen atmosphere, or combinations involving a controlled partial pressure of oxygen. The sized and heat treated luminescent diamond particles may be functionalized to adapt the same for a desired end use application. Luminescent diamond as disclosed herein display a comparable or higher level of a luminescence intensity than conventional luminescent diamond, and are made in a more efficient manner as contrasted with such conventional luminescent diamond.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages of luminescent nanodiamond and methods of making the same as disclosed herein will be appreciated as the same becomes better understood by reference to the following detailed description when considered in connection with the accompanying drawings where.

DETAILED DESCRIPTION

Figure 1:
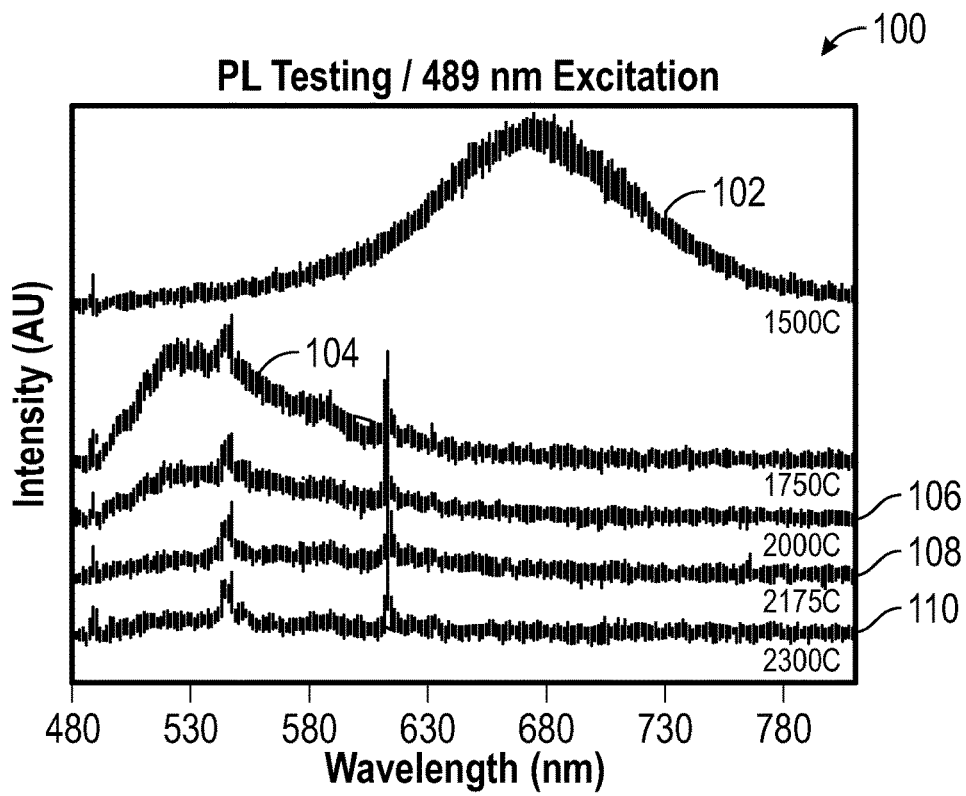
FIG. 1 is a graph illustrating luminescence intensity and wavelength information for diamond powder as disclosed herein when subjected to different elevated temperatures.

In some embodiments, luminescent diamond (e.g., photoluminescent diamond) and methods for making the same as disclosed herein is engineered in a manner that increases manufacturing efficiency and manufacturing volume to thereby improve affordability and availability of the substance for end-use applications including and not limited to the biological uses briefly noted above. Further, in some embodiments, luminescent diamond as prepared in accordance with the principles disclosed herein display a level of luminescence intensity that is similar to or greater than that of conventional luminescent diamond, to thereby present an opportunity for expanding the range of potential end-use applications for such material. For purposes of clarity, in some embodiments luminescent diamond as disclosed herein is formed initially by consolidation and compaction of pre-existing diamond grains, forming a luminescent active sintered or mechanically combined semi-sintered body or slug. In such condition, the consolidated material is referred to herein as luminescent diamond. During a subsequent procedure the luminescent diamond is reduced in size as called for by a particular end use, and in some embodiments, the resulting diamond particles or grains are nanoscale in size. In some instances, the reduced sized luminescent diamond may be exclusively nano-size particles, or may include a combination of nano-size particles with coarser diamond particles. The term "nanodiamond" as used herein is understood to refer to luminescent diamond including nano-size diamond particles, i.e., having an average size between about 1 to 1000 nm.

In some embodiments, luminescent diamond as disclosed herein may be formed by combining a volume of precursor diamond grains, which may be in the form of natural and/or synthetic diamond grains, and placing the volume of diamond grains into a can or container as conventionally used for diamond grain consolidation. In an example, the diamond grains may have an average grain size of from about 1 to 1000 μm, from about 1 to 100 μm, and from about 10 to 50 μm. In other embodiments, the initial diamond grain or powder sizes may extend into the submicron or nanodiamond range, as previously described. In some embodiments, nanosized powders formed either by mechanical crushing of conventional diamond powders or detonation processes can be employed in a similar manner. The conventional diamond powders can either be of synthetic or natural origin, however synthetic diamond powder generally has a higher intrinsic nitrogen content which along with an adjacent vacancy makes the diamond luminescent active. In an example, it is desired that the starting diamond material have an intrinsic amount of nitrogen impurity that is consistent with that found in diamond designated as type 1b, specifically about 50 ppm nitrogen or higher. Nanopowders synthesized through shock synthesis generally have higher intrinsic nitrogen content as well. In some embodiments, the container and its contents are subjected to a high-pressure/high-temperature (HPHT) consolidation process using conventional press equipment for making polycrystalline diamond. In some embodiments, the volume of diamond grains is placed into the can or container and the can or container may or may not be sealed and is placed within a HPHT press and subjected to desired sintering pressure and temperature conditions. In some embodiments, the HPHT process temperature may be in the range of from about 1300 to 2200° C., and the process pressure may be from about 5.0 GPa to about 10 GPa. In some embodiments, the volume of diamond grains is substantially free of any catalyst material, so that diamond material resulting from the HPHT process is not fully sintered, but rather is in the form of a semi-sintered slug or body including diamond grains that are mechanically combined together by frictional contact, cold welding, diamond self-diffusion and the like. A feature of producing a diamond material that is not fully sintered, i.e., that is semi-sintered and not characterized by a network of bonded-together diamond grains making use of a conventional metal solvent catalyst, is that the relative transparency of the same as contrasted with a sintered polycrystalline diamond body can be improved, and the transparency may improve the intensity of luminescent emission therefrom. There may also be graphite that forms in the porous regions of the semi-sintered bode, which may decrease the intensity of the luminescence. In such case it is desired that the graphitic material be partially or completely removed as part of the manufacturing process.

During the HPHT process, it has been discovered that at least a portion of the volume of precursor diamond grains undergoes plastic deformation. In some embodiments, the extent of the HPHT consolidation process is such to cause sufficient plastic deformation in the diamond grains to create nitrogen vacancy (N—V or N—V—N) defects in the diamond grains that operate to make the diamond grains luminescent active. Plastic deformation of diamond particles during HPHT is believed to create vacancies as deformation mechanisms such as crystallographic dislocation motions become active, which vacancies can in turn combine with nitrogen impurities to form the nitrogen vacancy (N—V or N—V—N) defects which create the desired luminescent activity. In some embodiments, this occurs during conventional sintering of polycrystalline diamond with metal or non-metal catalysts, such as respectively, cobalt and magnesium carbonate. In other embodiments, the diamond grains resulting from the HPHT process may be heavily plastically deformed with extensive N—V or N—V—N defects, and weak diamond-diamond bonding in comparison to solvent catalyst bonded polycrystalline diamond. For example, in some embodiments, it is desired that the diamond grains incur such plastic deformation giving rise to luminescent activity during the HPHT process without resulting in a fully-sintered body, thereby making the downstream process of sizing the diamond grains, by crushing process or the like, easier and less energy intensive, as only breaking apart mechanically combined diamond grains is required.

In some embodiments, luminescent diamond as disclosed herein may be formed in a similar manner, by subjecting a volume of diamond precursor grains to an HPHT process in the presence of a catalyst material. In such embodiments, the type of catalyst materials used may be selected from the group including and not limited to Co, Fe, Ni, carbonates, Si and combinations thereof for forming polycrystalline diamond (PCD). In some embodiments, HPHT processing conditions for cobalt PCD may be within a temperature of from about 1300 to 1500° C. and pressures from about 5.0 to 7.5 GPa. In addition, cobalt PCD is typically heat treated in vacuum at temperatures of 600 to 700° C. The amount of the catalyst material used can and will vary depending on such factors as the type of catalyst used, the amount of luminescence desired, and the particular end-use application. In biological end-use applications, for biocompatibility reasons, the presence of a metal material in the luminescent diamond may not be desired and/or permitted, in which case it may be desired to use non-metallic catalyst. In some embodiments, using a nonmetallic catalyst results in a PCD body having relatively higher transparency or reduced opacity when compared to PCD formed using a metal solvent catalyst. In some embodiments, non-metallic catalyst useful for making luminescent diamond as disclosed herein includes carbonate catalysts such as magnesium carbonate, calcium carbonate, or the like, resulting in the formation of carbonate PCD (CPCD). In an example embodiment, the amount of such carbonate catalyst may be an amount sufficient to form a completely sintered carbonate PCD body, e.g., up to about 5 percent by weight based on the total weight of the carbonate catalyst and the diamond grains. Carbonate PCD appears to be intrinsically less dark/more transparent than cobalt PCD, which is believed to contribute to a higher level of luminescent emission and intensity. In some embodiments, HPHT processing of carbonate PCD may be at temperatures of from about 1700 to 3000° C. and greater than about 7.0 GPa pressure. In addition, carbonate PCD may be heat treated in an inert or vacuum environment to temperatures of about 500 to 1300° C. As with the embodiments described earlier, HPHT processing produces plastic deformations in the diamond grains creating N—V or N—V—N defects that give rise to an increased level of luminescent activity/intensity as compared to the precursor diamond grains. Some vacancies formed during HPHT may not combine with nitrogen during the plastic deformation process and may migrate adjacent to nitrogen sites during heat treatment, creating additional N—V or N—V—N sites. The higher processing temperature and pressure conditions involved with carbonate PCD may produce a higher degree of plastic deformation in the diamond grains, and therefore produce higher luminescence activity. The use of higher heat treating temperatures may also contribute to additional N—V or N—V—N defects, and therefore higher luminescent activity.

In some embodiments, it may be desired that the amount of catalyst material used be less than that useful to form a completely sintered PCD body, e.g., less than about 5 percent by weight catalyst (compared to the total weight of the diamond layer or PCD body). In such embodiments, it may be desired to produce a partially-sintered or semi-sintered PCD body that includes both intercrystalline bonded diamond and free diamond grains for the purpose of easing the downstream process of sizing the PCD body into nano-sized diamond pieces or grains as better described below. It has been discovered that PCD made in the manner disclosed herein produces a level of luminescence intensity that is greater than that of conventional luminescent nano-diamond, and for this reason, producing a product during HPHT processing that has some PCD even if not producing a fully-sintered diamond body, may provide desired increases in luminescence intensity while also making the downstream process of sizing relatively easier and less energy intensive than one involving a fully-sintered PCD body. Thus, by adjusting the amount of catalyst material, a diamond material having a desired degree of sintering that yields both a desired increase in luminescence intensity while easing the downstream sizing process may be obtained.

FIG. 1 is a graph 100 of luminescence intensity vs. wavelength that shows the effect of HPHT temperature on diamond grains without a catalyst material subjected to a pressure of approximately 13.5 ksi hydraulic pressure (7.3 to 7.7 GPa cell pressure) and a series of different temperatures from 1500 to 2300° C. Specifically, the graph illustrates the luminescent characteristics for a diamond grains subjected to the HPHT process at 1500° C. 102, diamond grains subjected to the HPHT process at 1750° C. 104, diamond grains subjected to the HPHT process at 2000° C. 106, diamond grains subjected to the HPHT process at 2175° C. 108, and diamond grains subjected to the HPHT process at 2300° C. 110. The diamond grains subjected to each of the above-noted HPHT processes had an average particle size of approximately 10 μm. It is well known that N—V centers in diamond create red luminescence with a peak centered at about 675 nm, and the N—V—N centers in diamond create green luminescence with a peak centered at about 525 nm. In this test it was demonstrated that both N—V and N—V—N luminescence can be created in the same diamond material depending only on the HPHT temperature. The luminescence characteristics illustrated in FIG. 1 were produced by subjecting the diamond grains examples to 489 nm laser illumination as collected with a spectrometer. In these tests, it was shown that only the HPHT temperature condition of 1500° C. produced the N—V luminescence, while the HPHT temperature conditions of 1750, 2000, 2175, and 2300° C. produced N—V—N luminescence of varying intensity.

Figure 2A:
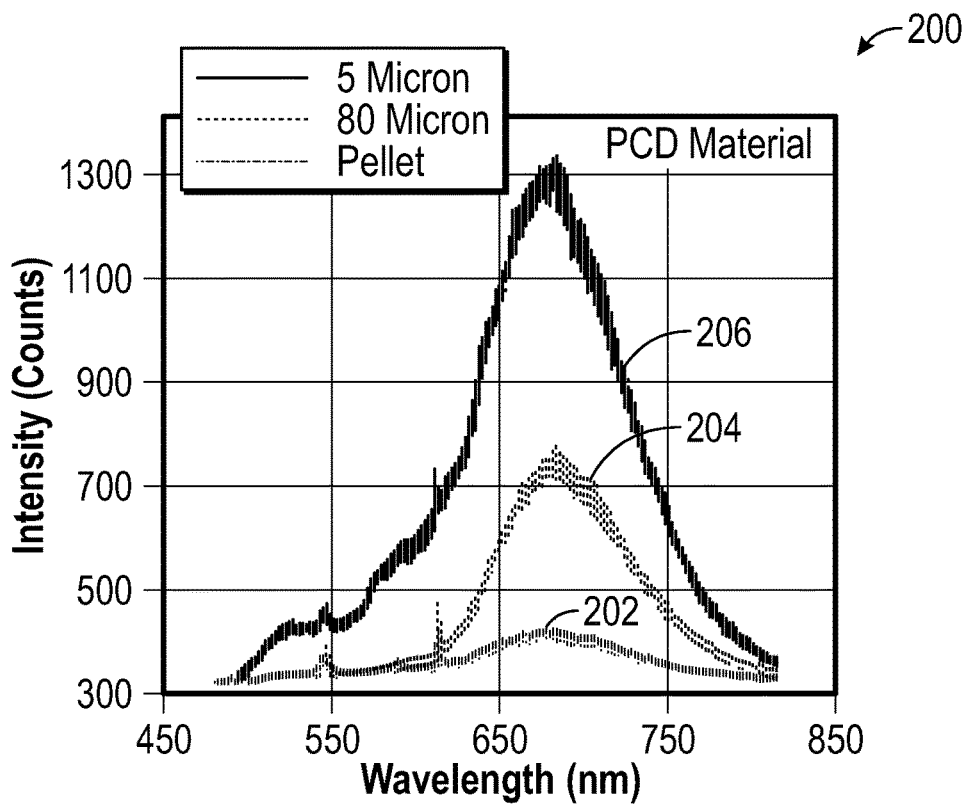
FIG. 2A is a graph illustrating luminescence intensity and wavelength information for a polycrystalline diamond material including a cobalt catalyst as disclosed herein at different particle sizes.
Figure 2B:
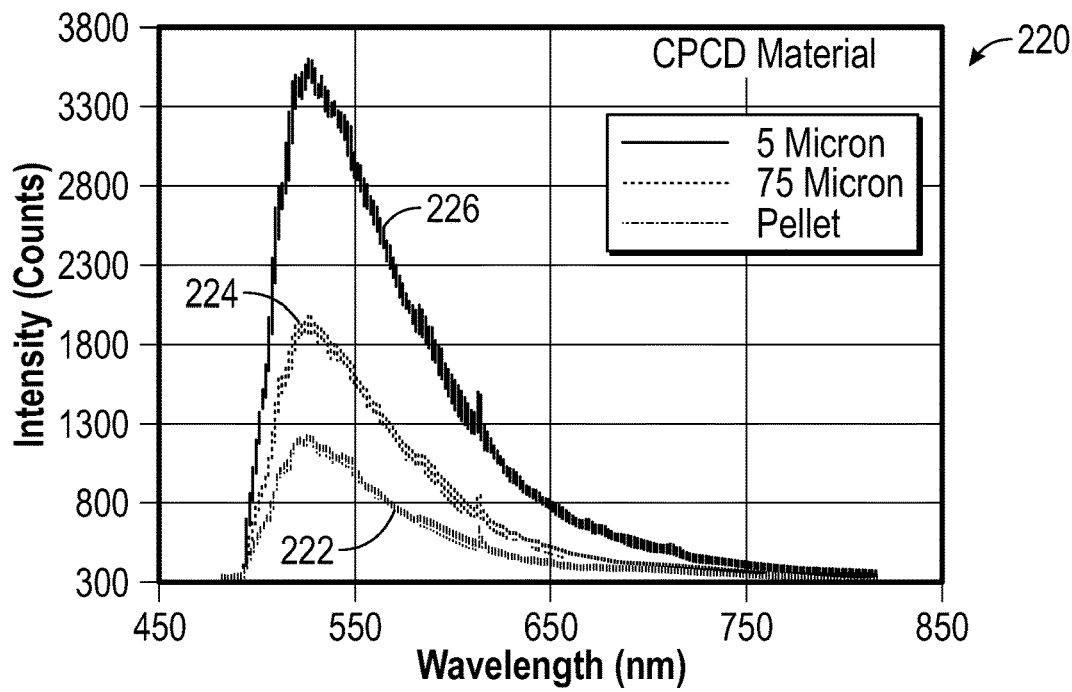
FIG. 2B is a graph illustrating luminescence intensity and wavelength information for a polycrystalline diamond material including a carbonate catalyst as disclosed herein at different particle sizes.

FIGS. 2A and 2B are graphs 200 and 220 that illustrate the effect of particle size on N—V and N—V—N luminescence intensity from a 488 nm laser source. FIG. 2A shows the luminescence intensity from a conventional polycrystalline diamond (PCD) material with a cobalt catalyst used for shear cutter applications that was sintered at a condition of approximately 11 ksi (6.5 to 6.9 GPa) and 1450° C., and that had a cobalt content of approximately 10 weight percent based on the total weight of the PCD material. The PCD material was formed from diamond grains having an average particle size of approximately 17 μm. The PCD material was tested in the form of a pellet 202 having a size of approximately 1 mm, in the form of crushed PCD particles having an average size of approximately 80 μm 204, and in the form of crushed PCD particles having an average size of approximately 5 μm 206. This test demonstrated that the PCD material displayed an increase in luminescence intensity with reduced PCD material particle size.

FIG. 2B shows the luminescence intensity from a magnesium carbonate polycrystalline diamond (CPCD) material that was sintered at 13.5 ksi (7.3 to 7.7 GPa) and 2200° C., and that had a magnesium carbonate content of approximately 8 weight percent based on the total weight of the CPDC material. The CPCD material was formed from diamond grains having an average particle size of approximately 2 μm. The CPCD material was tested in the same sized forms as the PCD material discussed above. Specifically, The CPCD material was tested in the form of a pellet 222 having a size of approximately 1 mm, in the form of crushed CPCD particles having an average size of approximately 75 μm 224, and in the form of crushed CPCD particles having an average size of approximately 5 μm 226. In both cases (FIGS. 2A and 2B) it was observed that the luminescence intensity of the respective PCD and CPCD material increased with decreasing particle size. In some embodiments, the luminescence intensity increase may be primarily the result of more surface area being exposed to the laser excitation source due to the reduced particle size. By comparison with the uncrushed pellet material, the intensity increase in both cases was shown to increase about a factor of 4. With crushing to even finer sizes it is expected that further increases in luminescence intensity are possible.

Figure 3:
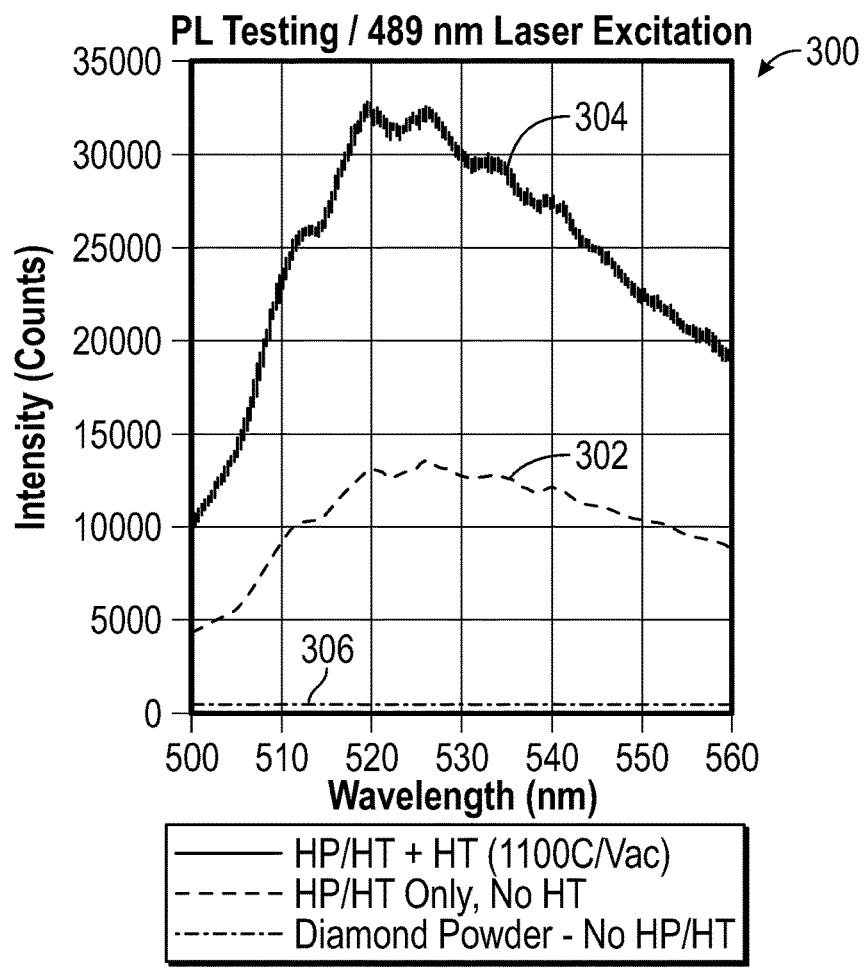
FIG. 3 is a graph illustrating luminescence intensity and wavelength information for a polycrystalline diamond material including a carbonate catalyst as disclosed herein with and without vacuum heat treatment.

FIG. 3 is a graph 300 that illustrates the effect that heat treating the CPCD material (previously described in the context of FIG. 2B, and having an average particle size of approximately 2 μm) in conditions of approximately 1100° C. under vacuum conditions has on the luminescence intensity. The luminescence intensity of a sample of the CPCD that was not subjected to the heat treatment is shown as 302, while the luminescence intensity of a sample of the CPCD that was subjected to the above-described heat treatment is shown as 304. As illustrated, the luminescence intensity of the heat treated sample 304 increased by a factor of 2.2 over the non-heat treated sample 302. In some embodiments, this gain in luminescence intensity may be the result of the formation of additional N—V—N centers due to diffusive nitrogen migration during the heat treatment process. The ability to achieve increased luminescence intensity in the green wavelength with only heat treatment at relatively low temperature, e.g., without having to increase the HPHT pressure, was not expected. FIG. 3 also shows the relative increase in luminescence intensity relative to raw diamond powder 306 that has not gone through a HPHT process as disclosed herein.

Figure 4:
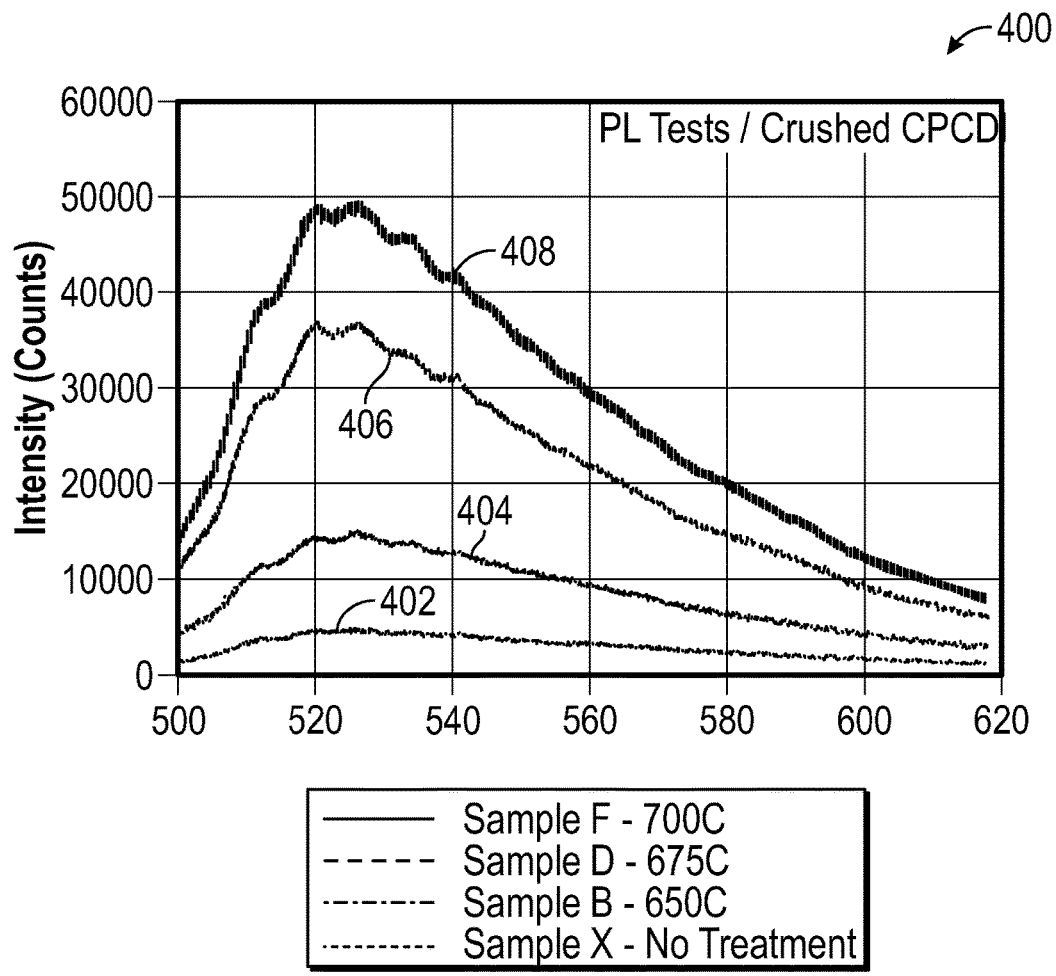
FIG. 4 is a graph illustrating luminescence intensity and wavelength information for a polycrystalline diamond material including a carbonate catalyst that has been sized into diamond particles and that has been subjected to air heat treatment at different temperatures.

FIG. 4 is a graph 400 that illustrates the effect of heat treatment of a CPCD material under oxidizing conditions. The baseline CPCD material was formed at HPHT conditions of approximately 13.5 ksi hydraulic pressure (cell pressure 7.3 to 7.7 GPa) and approximately 2200° C., and had a magnesium carbonate content of approximately 8 weight percent based on the total weight of the CPDC material. The CPCD material was formed from diamond grains having an average particle size of approximately 2 μm. The CPCD material was crushed to approximately 5 μm and heat treated at 1100° C. under vacuum conditions. The oxidizing heat treatment was performed in air at temperatures of approximately 650, 675, and 700° C. all for the same exposure time of approximately 120 minutes. Graph 400 illustrates the luminescence intensity for a sample not subjected to the oxidizing heat treatment 402, the sample subjected to 650° C. 404, the sample subjected to 675° C. 406, and the sample subjected to 700° C. 408. The luminescence intensity was shown to increase progressively with increasing treatment temperature such that an overall improvement in luminescence intensity of about 10 times (relative to the untreated sample) was observed. The heat treatment was accompanied by a progressive whitening of the material, which changed from a dark grey color to a near-white condition. This is believed to be due to a change in the surface chemistry on the diamond surfaces to a condition of oxygen-terminated bonds.

Figure 5:
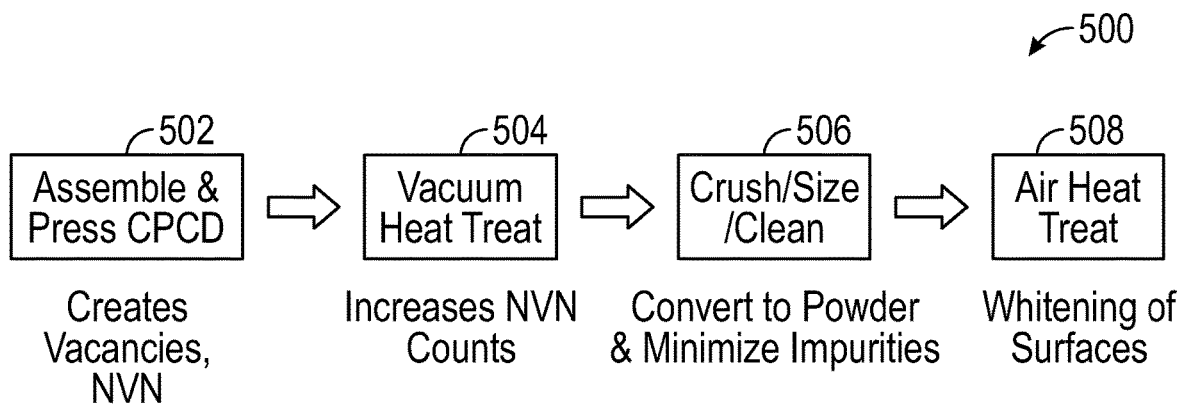
FIG. 5 is a block diagram illustrating processing steps for making luminescent diamond as disclosed herein.

FIG. 5 is a block diagram 500 illustrating processing that may be used for making luminescent diamond. In an example, the processes may be carried out in a series that include two or more of the steps that are illustrated. In a first process 502, materials useful for making the luminescent diamond are combined and assembled in the manner discussed earlier which may or may not include the use of a catalyst material, and that includes subjecting the assembled or combined materials to an HPHT process, which may or may not result in the formation of a fully-sintered diamond compact. In some embodiments, the first process 502 creates vacancies in the resulting diamond material for forming nitrogen (N—V or/and N—V—N) defects as discussed above. In a second optional process 504 the diamond material produced from the first process 502 is subjected to a heat treatment process under vacuum conditions. As discussed above, with reference to the luminescence intensity results illustrated in FIG. 3, in some embodiments, subjecting the diamond material after the first step 502 to such heat treatment further increases the luminescence intensity of the diamond material (e.g., by 1.5 to 2.2 times a non-heat treated diamond material) by increasing the nitrogen defect (i.e., N—V—N) count. In a third optional process 506, the diamond material from process one 502 or process two 504 is reduced in size by crushing or other sizing technique as discussed above. The exact size of diamond particles formed during this third step may depend on the particular end-use application for the luminescent diamond material. Different diamond particle sizes of luminescent diamond materials have been disclosed above. During this third process 506, the diamond material is converted to powder. In some embodiments, reducing the size of the diamond material increases the luminescence intensity of the diamond material by 3 to 4 times due to the increased surface area of the resulting powder. In a fourth optional process 508, the diamond material from process one 502, process two 504, or process three 506 is subjected to an air heat treatment, e.g., an oxidizing heat treatment, as discussed above with reference to the luminescence intensity results illustrated in FIG. 4). In some embodiments, the air heat treatment whitens surfaces of the diamond material which is believed due to the formation of oxygen-terminated diamond bonds. As discussed above, with reference to the luminescence intensity results illustrated in FIG. 4, in some embodiments, subjecting the diamond material to this fourth process 508 increases the luminescence intensity by about 10 times. As noted above, in some embodiments, luminescence diamond materials as disclosed herein may be formed according to one or more of these processes, and in some embodiment using all of these processes in sequential order depending on the degree of luminescence intensity called for by the particular end-use application.

Figure 6:
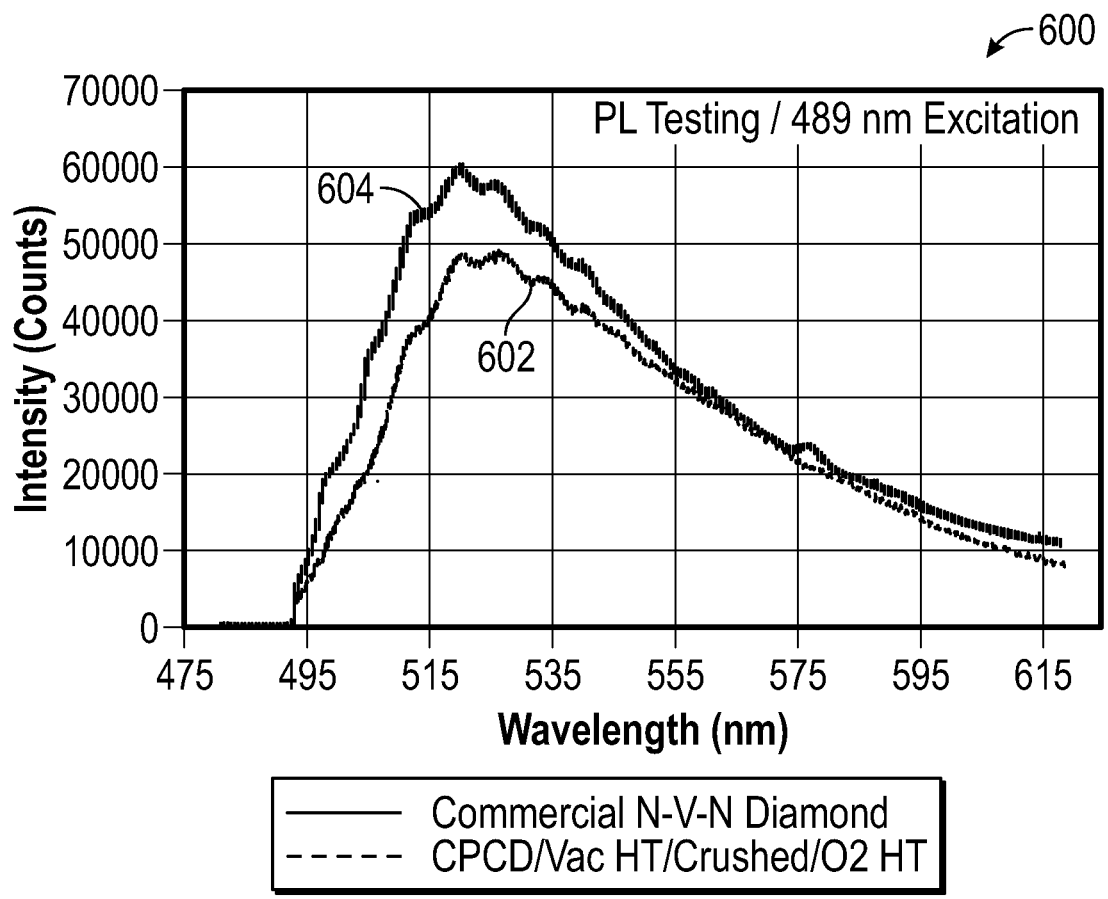
FIG. 6 is a graph illustrating luminescence intensity and wavelength information for a luminescent diamond material as disclosed herein as compared with a conventional luminescent diamond.

FIG. 6 is a graph that illustrates the luminescence intensity of a luminescent diamond material made using all the processes illustrated in FIG. 5. The diamond material is CPCD formed by an HPHT process at 13.5 ksi and 2,200° C., where the CPCD included approximately 8 percent by weight magnesium carbonate based on the total weight of the CPCD. The CPCD material was formed from diamond grains having an average particle size of approximately 2 μm. The resulting CPCD was subjected to vacuum heat treatment at a temperature of approximately 1100° C. for a period of approximately 60 minutes (step two). The resulting heat treated CPCD was reduced in size or crushed to an average diamond particle size of approximately 5 μm in conjunction with screening coarser particles out with a −170 mesh sieve. The resulting diamond particles were then subjected to air heat treatment at a temperature of approximately 700° C. for 120 minutes. The luminescence intensity for the resulting material is shown 602 in the graph and is compared to the luminescence intensity of a commercial luminescent nanodiamond material shown as 604 in the graph having an average particle size of about 1 μm. From the graph 600, it can be seen that the luminescence results of the luminescent diamond as disclosed herein are comparable (within 15%) to the commercial luminescent nanodiamond material. Because the luminescent diamond material as disclosed herein was tested has an average particle size of 5 μm, i.e., 5 times larger than the average particle size of the commercial luminescent nanodiamond material, it is expected that with further reduction in particle size, equivalent or better N—V—N intensities can be achieved. Additional optimization/modification with heat treating steps are likewise expected to further increase luminescence intensity.

Figure 7:
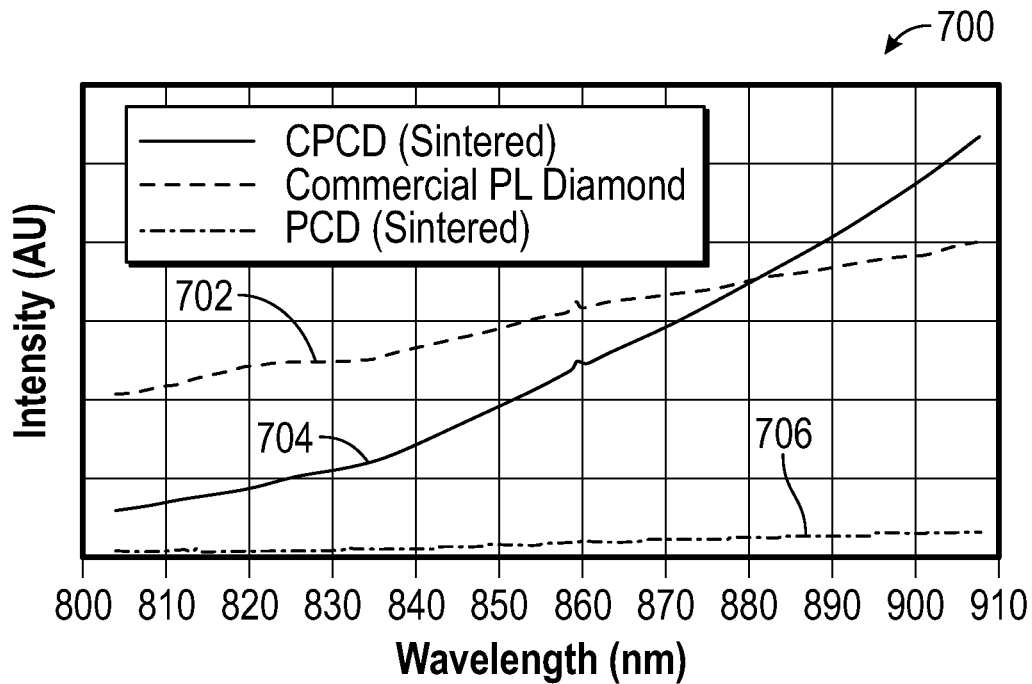
FIG. 7 is a graph illustrating the relative luminescence intensity of luminescent diamond materials as disclosed herein in a sintered state as contrasted with a conventional luminescent nanodiamond.

FIG. 7 is a graph 700 that illustrates the relative luminescence intensities at higher wavelengths than associated with N—V or N—V—N centers of a conventional luminescent nanodiamond powder 702 having an average diameter of 100 nm as compared to that of fully-sintered carbonate PCD 104 and a fully-sintered cobalt PCD 104 each formed in the manner described above, as measured between light wavelengths of about 804 to 908 nm (along the x-axis), where the carbonate PCD and cobalt PCD are in the form of a fully sintered body. In this example, the cobalt PCD was formed from diamond grains having an average size of approximately 17 μm, and subjected to a pressure of approximately 11 ksi (6.5 to 6.9 GPa) and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 2 μm, and subjected to a pressure of approximately 13.5 ksi (7.3 to 7.7 GPa) and a temperature of approximately 2200° C. The resulting carbonate PCD had a magnesium carbonate content of approximately 8 percent by weight based on the total weight of the carbonate PCD. Higher wavelength luminescence is of interest for biological luminescence applications because it enables the use of lower energy illumination sources, which are less damaging to sensitive organic materials, living tissues, etc. This data was gathered by subjecting each of the diamond materials to a laser operating at a wavelength of approximately 785 nm using a spectrometer, Process Instruments Model PI-100, and monitoring the luminescence from the diamond materials. Graph 700 shows an average of 5 to 15 scans at random locations for each diamond material. As illustrated, the measured luminescence intensity at a wavelength of approximately 908 nm for the carbonate PCD 704 is about 30 percent greater than that of the conventional luminescent nanodiamond powder 702, demonstrating the increased level of luminescence intensity that is emitted by the luminescent diamond material in the form of carbonate PCD as disclosed herein. The measured luminescence intensity at a wavelength of approximately 908 nm for the cobalt PCD 706 is about 8 percent greater than that of the conventional luminescent nanodiamond powder 702. The carbonate PCD used to generate the data in FIG. 7 is in sintered form, i.e., in the form of a sintered body, and is not yet reduced in size to smaller particles or nano-sized particles or grains. As described above, the process of reducing the sintered PCD body to smaller-sized, e.g., nano-sized, diamond particles or grains can subject the diamond material to further plastic deformations, which operates to still further increase the luminescent activity/intensity in the resulting diamond particles.

Figure 8:
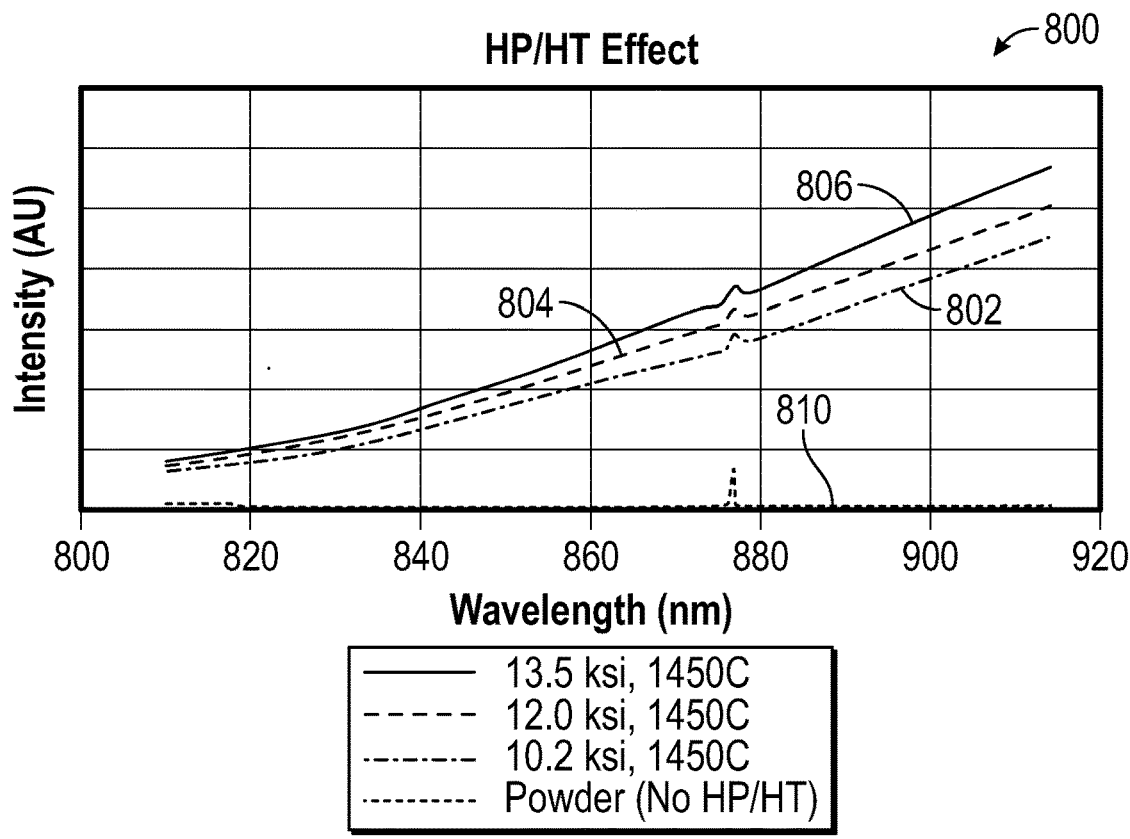
FIG. 8 is a graph illustrating the relative luminescence intensities of luminescent diamond materials as disclosed herein in a sintered state as a function of processing pressures and as related to diamond powder that has not been subjected to high-pressure/high-temperature processing.

FIG. 8 is a graph 800 that illustrates the relative luminescence intensities of different example luminescent diamond materials in the form of cobalt PCD 802, 804 and 806 as a function of different HPHT processing pressures as compared to the precursor diamond powder 810 not subjected to an HPHT process, all within light wavelengths of from about 810 to 915 nm (along the x-axis). In each example, the cobalt PCD was formed from diamond grains or powder having an average particle size of approximately 17 μm, and using approximately 10 weight percent cobalt based on the total weight of the resulting cobalt PCD. The diamond powder 810 not subjected to a HPHT process shows no significant luminescent activity or luminescence intensity. Luminescent diamond formed using a cobalt catalyst and in the form of sintered PCD, i.e., cobalt PCD, shows increasing levels of luminescence intensity with progressively increasing pressure processing conditions, 802 at 10.2 ksi and 1450° C., 804 at 12.0 ksi and 1450° C., and 806 at 13.5 ksi and 1450° C., suggesting an increased level of plastic deformations in the diamond grains produce greater luminescent activity and higher luminescence intensities. The pressure levels of 10.2, 12.0, and 13.5 ksi correspond to hydraulic pressures used to operate the HPHT apparatus. Hydraulic pressure to cell pressure conversion is approximately as follows: 10.2 ksi=6.0 to 6.4 GPa internal cell pressure, 12 ksi=6.9 to 7.3 GPa internal cell pressure, and 13.5 GPa=7.3 to 7.7 GPa internal cell pressure, with the range depending on both the temperature and specific cell design/materials employed. This data shows that the luminescent diamond as disclosed herein in the form of cobalt PCD displays a luminescence intensity that is at least 2 orders of magnitude greater, and in some cases at least 3 orders of magnitude greater, than that of the precursor diamond grains not subjected to the HPHT process. As noted above for the data presented in FIG. 7, the PCD samples being measured are in the form of a fully-sintered body that have not yet been reduced into a desired particle size, e.g., nano-sized diamond particles or grains. As described previously, in some embodiments, the process of reducing particle size: 1) creates more diamond surface area for exposure to the laser illumination under luminescent conditions; and 2) can also subject the diamond material to still further plastic deformations, both of which mechanisms can operate to further increase the luminescent activity and luminescence intensity of the resulting diamond particle material.

In some embodiments, after the diamond precursor material has been subjected to HPHT consolidation conditions/processing as discussed above, the resulting diamond material is subjected to further treatment(s) for the purpose of further increasing luminescent activity and luminescence intensity. For example, such additional treatment(s) may include subjecting the consolidated diamond material to one or more further HPHT processes, and/or exposing the consolidated diamond material to other treatment techniques/processes that cause the diamond grains to incur further plastic deformations. The further HPHT processing may be done before or after a sizing reduction. It is to be understood that all such other techniques that operate to cause the diamond material from the HPHT process to undergo further plastic deformations that operate to increase luminescent activity are within the spirit and scope of this disclosure, and may include and not be limited to mechanical collision of the diamond material with another object, substance or material calculated to induce grain fracture and/or plastic deformation. The HPHT diamond material may be subjected to elevated temperatures in order to facilitate vacancies formed during HPHT to migrate to locations adjacent to nitrogen impurities, forming additional nitrogen (N—V and/or N—V—N) defects. In some embodiments, the HPHT diamond material as disclosed herein may be treated by ion bombardment and/or annealing or other conventional means useful to create additional N—V and/or N—V—N defects, centers or sites in the diamond material. Such further treatment(s) may take place in an elevated temperature environment or an ambient temperature environment. Use of charged nitrogen particles, such as contained in a nitrogen plasma chamber may be useful to make a specific balance of NV (uncharged nitrogen vacancy) and NV⁻ (negatively charged nitrogen vacancy) centers. The nature and extent of such treatment is understood to vary depending on the particular diamond material and end-use application, and may include a single treatment or a series/sequence of similar or different treatments. For example, the N—V center has been found to be very useful as a sensing device for determining the strength of a localized magnetic field. In other cases it may be useful to have both N—V and N—V—N centers active, as well as additional luminescent centers which are active in the infrared region. Also, the type of further treatment(s) that is used may depend on whether the diamond material resulting from the HPHT process one that is sintered and present in the form of PCD or one that is semi-sintered as noted above and present in the form of mechanically combined diamond grains, e.g., where no catalyst material was present during the HPHT process. Such further treatment(s) is believed to increase luminescence intensity by either creating more N—V and/or N—V—N defects or centers, or by exposing more of these N—V and/or N—V—N defects or centers by the creation of additional surface area during the fracture process.

In some embodiments where the luminescent diamond resulting from the HPHT process is in the form of a metal PCD, e.g., cobalt PCD, it may be desired to treat the sintered PCD body to completely or partially remove the metal material therefrom, which may be done by leaching process or other process known in the art to remove the metal catalyst from the PCD to enable use in such those applications where the presence of metal is not desired or permitted, e.g., in biological applications. Also, removing the catalyst material from the PCD weakens the structure of the sintered body making it easier to crush and reduce in size. In some embodiments of luminescent diamond as disclosed herein that is formed using a carbonate catalyst, e.g., carbonate PCD, is that such a metal free PCD is metal free and thus may be used without the need for any catalyst removal in biological end-use applications. It may be helpful to use magnetic separation techniques to ensure that the luminescent diamond material is sufficiently free of metallic catalysts. In some embodiments of luminescent diamond provided in the form of carbonate PCD, a level of luminescence intensity that is substantially higher that than of cobalt PCD (as illustrated in FIG. 7) is obtained, which may result from the higher levels of temperature and pressure used in the HPHT sintering process employed in carbonate PCD, as well as a relative transparency increase and reduced opacity of the carbonate PCD as contrasted with the cobalt PCD as noted above.

Luminescent diamond as disclosed herein may be sized after the HPHT consolidation process to facilitate use in applications calling for smaller-sized diamond particles, e.g., nano-sized particles, such as in biological applications as discussed above. Accordingly, after the luminescent diamond has been consolidated by HPHT processing, it is subjected to a size reducing treatment for purposes of breaking the diamond material into smaller-sized diamond pieces or grains. In some embodiments, the luminescent diamond may be treated to reduce the size to an average diameter of about 1 nm to 1 mm, or from about 5 nm to 200 µm or the like. Examples of useful average particle size ranges include but are not limited to 5 to 100 nm, 100 to 200 nm, 200 to 1000 nm, 0.500 to 20 µm, and 20 to 200 µm. In other cases it may be useful for the average particulate size to be 1 µm or larger. The particular process that is used for reducing the size of the diamond material resulting from HPHT processing can and will vary depending on the particular material, e.g., whether the diamond material is in the form of sintered PCD, partially-sintered PCD, or mechanically-combined diamond grains. In some embodiments, the diamond material may be crushed by high-velocity impact with a high-strength target, e.g., one made from tungsten carbide or the like, or by impact with another diamond material, e.g., self-impact under high-velocity conditions. In some embodiments where the diamond material is to be used in biological applications it is desired that the diamond material be reduced to nanosized pieces or particles. The process of reducing or sizing the diamond material may be carried out at an elevated temperature or ambient temperature condition in the event that such helps to make the process easier or in the event that such causes the diamond material to undergo further plastic deformations to further increase luminescent activity and luminescence intensity. Sorting by magnetic or other mechanical technique may be used for purposes of isolating the luminescent diamond particles with cobalt inclusions from luminescent particles free of cobalt inclusions. In some end use applications, the shape of the resulting particulate may be relevant as some cellular structures are sensitive to sharp edges such as those created with fragmented diamond crystals. In these applications, it may be advantageous to employ detonation nanodiamond as the starting material as these particulates are essentially spherical in shape. In some embodiments, treating the material in an oxidizing environment as described previously has been shown to remove 50% or more of the diamond crystals under some conditions, which can be employed to remove sharp edges and increase the sphericity of the particulates. In all the powder sizing mentioned above, an adequate definition of particle size can be achieved by employing the approach of equivalent circle of equal projection area as defined by $D_{EQPC}=2\sqrt{A/\pi}$, where $D_{EQPC}$ is the diameter of a circle with the same projected area A as the particle of interest.

As noted briefly above, during the process of reducing the diamond material to desired diamond particle sizes, e.g., nano-sized particles, the diamond material can undergo further plastic deformations or fracture, e.g., beyond that which occurred during the HPHT process, causing the luminescent activity and the luminescence intensity of the resulting diamond material to further increase. Thus, the resulting sized diamond particles have a level of luminescence intensity that is greater than that of the diamond material after HPHT processing. Further, if an intermediate treatment as discussed above is carried out between HPHT processing and sizing, there may be two increases in luminescent activity/intensity between the diamond material in a consolidated state during after HPHT processing and the diamond particles after the reducing or sizing process.

Figure 9:
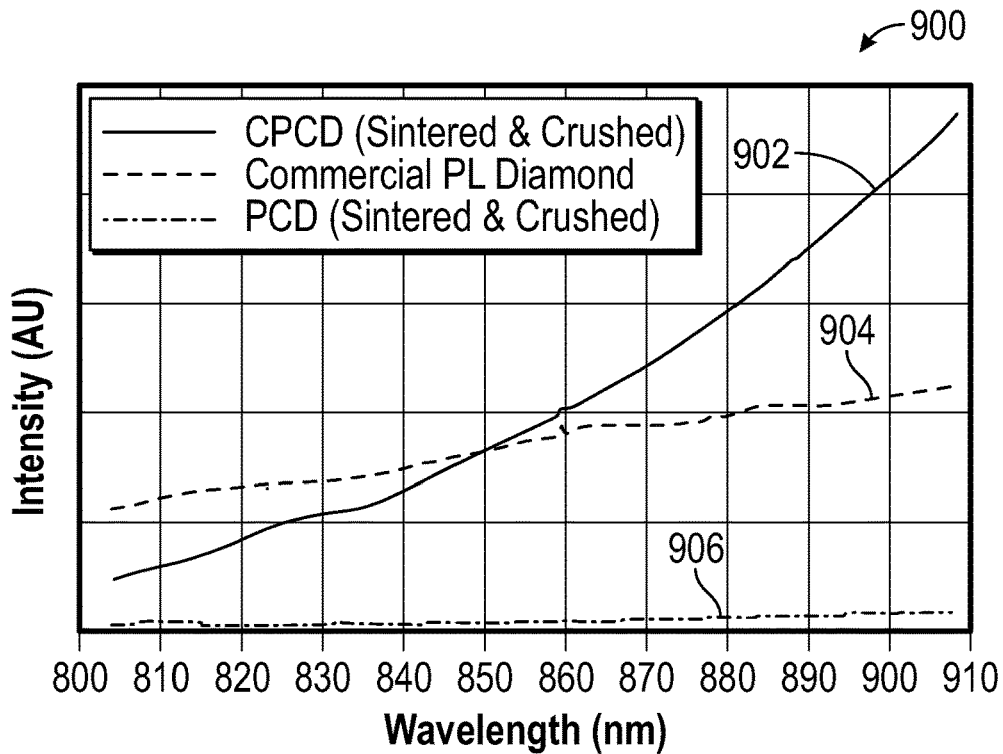
FIG. 9 is a graph illustrating the relative luminescence intensities of luminescent diamond materials as disclosed herein in a crushed state as contrasted with a conventional luminescent nanodiamond.

FIG. 9 is a graph 900 that illustrates the relative differences in luminescence intensity between a luminescent diamond 902 as disclosed herein formed from carbonate PCD that has been reduced in size into diamond particles (which may include some nano-sized particles) as compared to both the conventional luminescent nanodiamond 904 and the cobalt PCD nanodiamond 906 (that has also been reduced in size into diamond particles). In this example, the cobalt PCD was formed from diamond grains having an average size of approximately 17 µm, and subjected to a pressure of approximately 11 ksi (6.5 to 6.9 GPa) and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 10 μm, and subjected to a pressure of approximately 13.5 ksi (7.3 to 7.7 GPa) and a temperature of approximately 2200° C. The resulting carbonate PCD had a magnesium carbonate content of approximately 6 percent by weight based on the total weight of the carbonate PCD.

Figure 10:
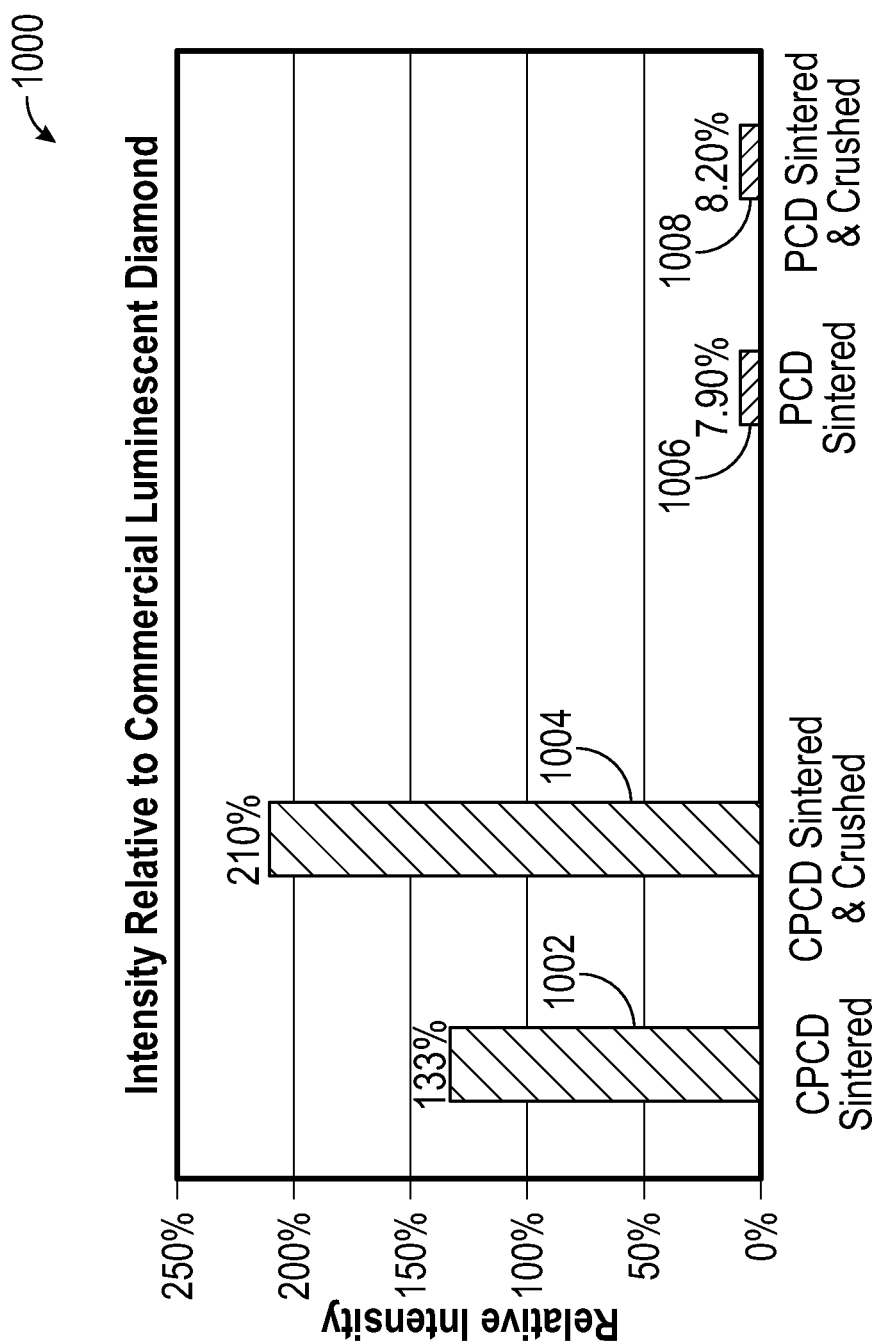
FIG. 10 is a bar chart illustrating relative luminescence intensities of luminescent diamond materials as disclosed herein in both sintered and crushed states as compared to conventional luminescent nanodiamond.

FIG. 10 is a graph 1000 that illustrates the differences in luminescence intensities of the carbonate PCD in both a sintered 1002 and crushed state 1004, and the cobalt PCD in both a sintered 1006 and crushed state 1008 relative to the conventional luminescent nanodiamond (which is denoted by a relative luminescence intensity of 100 percent). In this example, the cobalt PCD was formed from diamond grains having an average size of approximately 17 μm, and subjected to a pressure of approximately 11 ksi and a temperature of approximately 1450° C. The resulting cobalt PCD had a cobalt content of approximately 10 percent by weight based on the total weight of the cobalt PCD. In this example, the carbonate PCD was formed from diamond grains having an average size of approximately 10 μm, and subjected to a pressure of approximately 13.5 ksi (7.3 to 7.7 GPa) and a temperature of approximately 2200° C. The resulting carbonate PCD had a magnesium carbonate content of approximately 6 percent by weight based on the total weight of the carbonate PCD. In an example, the luminescence intensity of the crushed carbonate PCD diamond material may increase by about 50 percent or more as compared to the sintered carbonate PCD diamond material, and the luminescence intensity of the crushed cobalt PCD diamond may increase by about 4 percent or more as compared to the sintered cobalt PCD diamond. With reference to FIG. 10, the sintered carbonate PCD 1002 has a luminescence intensity that is about 30 percent greater than the conventional luminescent nanodiamond, the crushed carbonate PCD 1004 has a luminescence intensity that is about 100 percent greater than the conventional luminescent diamond, the sintered cobalt PCD 1006 has a luminescence intensity that is about 7.9 percent that of the conventional luminescent diamond, and the crushed cobalt PCD 1008 has a luminescence intensity that is about 8.2 percent that of the conventional luminescent diamond.

It is to be understood that the exact amount of luminescence intensity increase may vary depending on such factors as the particular type of luminescent diamond material, the technique or process used for reducing and the ultimate size of the luminescent diamond particles, other process treatments employed such as heat treatment in vacuum conditions and/or air heat treatment (as discussed above with reference to FIG. 5). In addition to displaying a much greater luminescence intensity than that of the conventional luminescent nanodiamond, the crushed carbonate luminescent diamond as measured at 908 nm maintained its luminescence intensity for a longer duration of time than that of the conventional luminescent nanodiamond. For example, the crushed carbonate luminescent diamond appeared to be reaching a limiting luminescence intensity value close to about 0.97 at ten scans, while at the same number of scans the conventional luminescent nanodiamond was below 0.93 with a still rapidly decreasing luminescence intensity slope.

For use of the luminescent diamond as disclosed herein in certain downstream applications such as biological uses, it may be desired that the luminescent diamond particles, e.g., nanodiamond, be further treated or functionalize to adapt the material for its intended use. The manner and type of treatment that may be used to functionalize the luminescent diamond material as disclosed herein is understood to vary depending on the particular end-use application. However, an example functionalizing process may be one that involves oxygen termination along the diamond surface to render the diamond surface hydrophilic, and may be established through a range of surface oxidation procedures. Such oxygen termination functionalization may include providing a mixture of =O, —OH, —COOH, or —C—O—C— groups on the surface. Other surface terminations may include hydrogen termination, halogenation, thermal annealing to create double bonds, and reduction to OH termination. A further type of functionalization may involve the grafting or attachment of certain molecules to the surface of the diamond treated as treated in the manner noted to promote such attachment, where such molecules are selected to readily react with different biomolecules. A still further type of functionalization may include biolabeling which may take place through an electrostatic (non-covalent) or covalently bonded attachment between the diamond particle and biomolecules. These are but a few methods in which luminescent diamond as disclosed herein may be functionalized for use in biological applications, and it is to be understood that other known approaches and techniques useful for functionalizing luminescent diamond for a particular biological use is within the scope and spirit of this disclosure.

Although a few example embodiments of luminescent diamond have been described in detail above, those skilled in the art will readily appreciate that many modifications are possible in the example embodiments without materially departing from this invention. For example, luminescent diamond as disclosed herein has been presented in the context of a biological end-use application. It is to be understood that luminescent diamond as disclosed herein may be use in end-use applications other than biological where a desired improved level of luminescence intensity is useful or beneficial. Other potential uses of luminescent diamond include but are not limited to usage in magnetic sensors, high resolution thermography, microscopic sensor arrays, anti-counterfeiting measures, ion concentration monitoring, membrane potential measurement, optical trapping, and strain/pressure sensors. Therefore, it is understood that luminescent diamond as disclosed herein is not intended to be limited to one particular end use application.

Accordingly, all such modifications and end-use applications of luminescent diamond are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function type claiming for any limitations of any of the claims herein, except for those in which the claim expressly uses the words 'means for' together with an associated function.

What is claimed is:

1. A method for making luminescent diamond comprising:
    subjecting a volume of precursor diamond grains to a high-pressure/high-temperature condition to cause the precursor diamond grains to undergo plastic deformation to produce a volume of resulting diamond grains containing nitrogen vacancy defects, wherein the resulting diamond grains display a level of luminescence intensity that is greater than that of the precursor diamond grains;

subsequently reducing the size of the resulting diamond grains via a size reducing treatment wherein the resulting diamond grains undergo plastic deformation or fracture, thereby producing luminescent diamond grains having an average diameter size of less than 20 µm, wherein the luminescent diamond grains display a level of luminescence intensity that is greater than that of the resulting diamond grains; and exposing the luminescent diamond grains to an oxidizing heat treatment in air, thereby increasing the level of luminescence intensity of the luminescent diamond grains.

2. The method as recited in claim 1, wherein the volume of the precursor diamond grains subjected to the high-pressure/high-temperature condition is free of a diamond sintering catalyst.

3. The method as recited in claim 1, further comprising after the subjecting and prior to the reducing, heat treating the resulting diamond grains to further increase the level of luminescence intensity.

4. The method as recited in claim 1, wherein after the reducing, the resulting diamond grains have an average diameter size of less than about 1000 nm.

5. The method as recited in claim 1, wherein before the subjecting, adding a volume of a catalyst material to the precursor volume of diamond grains.

6. The method as recited in claim 5, wherein after the subjecting, the volume of the diamond grains is in a semi-sintered condition.

7. The method as recited in claim 1, wherein after the subjecting, the resulting diamond grains have a level of luminescence intensity that is at least two orders of magnitude greater than a luminescence intensity of the precursor diamond grains.

8. The method as recited in claim 3, wherein after the heat treating, the resulting diamond grains have a level of luminescence intensity that is at least three orders of magnitude greater than a luminescence intensity of the precursor diamond grains.

9. A method for making luminescent diamond pieces comprising:

subjecting a volume of precursor diamond grains to a high-pressure/high temperature condition in the presence of a catalyst material to form a polycrystalline diamond body;

treating the polycrystalline diamond body to have a level of luminescence intensity that is greater than that of the polycrystalline diamond body; and reducing the treated polycrystalline diamond body into luminescent diamond pieces having an average diameter size less than 20 µm via a size reducing treatment wherein the treated polycrystalline diamond body undergoes plastic deformation or fracture, wherein the luminescent diamond pieces display a level of luminescence intensity that is greater than that of the treated polycrystalline diamond body; and exposing the luminescent diamond pieces to an oxidizing heat treatment in air, thereby increasing the level of luminescence intensity of the luminescent diamond pieces.

10. The method as recited in claim 9, further comprising subjecting the luminescent diamond pieces to a process for removing the catalyst material therefrom.

11. The method as recited in claim 9, wherein during the subjecting, an amount of the catalyst material is used that is less than an amount of the catalyst material required to make fully sintered luminescent diamond and the luminescent diamond pieces are semi-sintered.

12. The method as recited in claim 9, wherein after the subjecting and before the treating, the polycrystalline diamond body has a level of luminescence intensity that is at least two orders of magnitude greater than that of the volume of precursor diamond grains.

13. The method as recited in claim 12, wherein after the treating, the luminescent diamond pieces have a level of luminescence intensity that is at least 10 percent greater than that of the polycrystalline diamond body volume before the treating.

14. The method of claim 1 wherein the luminescent diamond grains are subjected to the oxidizing heat treatment in air at a temperature of from about 650° C. to about 700° C.

15. The method of claim 9 wherein the luminescent diamond pieces are subjected to the oxidizing heat treatment in air at a temperature of from about 650° C. to about 700° C.

* * * * *